(12) United States Patent
Roy

(10) Patent No.: US 6,408,779 B1
(45) Date of Patent: Jun. 25, 2002

(54) ADJUSTABLE OUTRIGGER

(76) Inventor: George Roy, 16-106 Royal Palm Way, Boca Raton, FL (US) 33432

(*) Notice: Subject to any disclaimer, the term of this patent is extended or adjusted under 35 U.S.C. 154(b) by 0 days.

(21) Appl. No.: 09/970,384

(22) Filed: Oct. 2, 2001

(51) Int. Cl.$^7$ ................................................ B63B 3/00
(52) U.S. Cl. ..................... 114/255; 114/343; 43/43.12
(58) Field of Search ................................. 114/255, 343; 43/27.4, 43.12

(56) References Cited

U.S. PATENT DOCUMENTS

| | | | | |
|---|---|---|---|---|
| 4,813,171 A | * | 3/1989 | Cooper et al. ................ | 43/21.2 |
| 5,140,928 A | * | 8/1992 | Frick ........................... | 114/255 |
| 5,243,927 A | * | 9/1993 | Messick ....................... | 114/255 |
| 5,245,780 A | * | 9/1993 | Hansen et al. ............... | 248/515 |

* cited by examiner

Primary Examiner—Jesus D. Sotelo
(74) Attorney, Agent, or Firm—McCormick, Paulding & Huber LLP

(57) ABSTRACT

An outrigger for use with a fishing boat having a support surface for mounting the outrigger thereon, the outrigger having a vertical member supported for rotation about a vertical axis and a boom member having a first end thereof pivotably coupled to the vertical member for movement about a horizontal axis. A variable length cylinder is pivotably coupled at the ends thereof to the vertical member and the boom member respectively. A control system is coupled to the cylinder for controlling the length thereof such that the inclination of the boom member is positionable relative to the vertical member via the control system. Thus, the boom member can be automatically positioned in an inclined position for trolling or a horizontal position for stowage of the outrigger. A fishing line can be attached to the boom to position the fishing line away from the boat during trolling.

19 Claims, 3 Drawing Sheets

ADJUSTABLE OUTRIGGER

FIELD OF THE INVENTION

The present invention is generally directed to an outrigger for use with a fishing boat, and more specifically directed to an outrigger for use with a fishing boat having a power actuated boom member.

BACKGROUND OF THE INVENTION

The present invention outrigger has general utility with respect to fishing boats and is particularly useful with fishing boats having a T-top or roof. Often, in a fishing boat having a T-top or roof, one or more outriggers are attached to the roof thereof. Normally, an outrigger of this type includes a boom member coupled to a rotatable vertical member such that the boom member is positionable in an extended position beyond the hull of the boat for supporting a fishing line away from the boat during trolling. Typically, the angular position of the boom member relative to the vertical member is adjustable via a manual adjustable mechanism located on top of the roof of the boat. Usually, the outrigger is stored with the boom member in a horizontal position and operable with the boom member positioned at an incline with respect to the vertical member.

One drawback with this type of outrigger system is that a person cannot adjust the angle of the boom member of the outrigger with respect to the vertical member thereof from a position under the T-top or roof but must inconveniently reach outside of the cabin of the boat and over the roof in order to adjust such angular positioning of the boom member of the outrigger. This problem is exacerbated with the use of multiple outriggers.

Based on the foregoing, it is the general object of the present invention to provide an outrigger for use with fishing boats that overcomes the problems and drawbacks of the prior art.

SUMMARY OF THE INVENTION

The present invention is directed in one aspect to an outrigger for use with a fishing boat having a support surface for mounting the outrigger thereon. The outrigger includes a vertical member rotatable about a vertical axis, the vertical member having an upper portion extending above the support surface and a lower portion extending below the support surface. The vertical member is rotatably attached to the support surface. A mounting means attached to the boat below the support surface rotatably supports the lower portion of the vertical member. A first end of a boom member is pivotably coupled to the upper portion of the vertical member for movement about a horizontal axis. A variable length cylinder is pivotably coupled between the upper portion of the vertical member and the boom member. A control system coupled to the cylinder adjusts the length thereof, such that the inclination of the boom member is positionable relative to the vertical member. Thus, the boom member is positionable relative to the vertical member in various angular positions such as an inclined position for trolling or a horizontal position for stowage of the outrigger.

In the preferred embodiment, the cylinder is hydraulic and controlled via an electric switch such that the angular position of the boom member of the outrigger can be adjusted via a switch. The switch can be conveniently mounted interior the cabin of the boat for ease of use of the outrigger.

In another aspect, the invention provides a kit for modifying existing outrigger systems to automate the angular positioning of the boom member of the outrigger.

DETAILED DESCRIPTION OF THE PREFERRED EMBODIMENT

Figure 1:
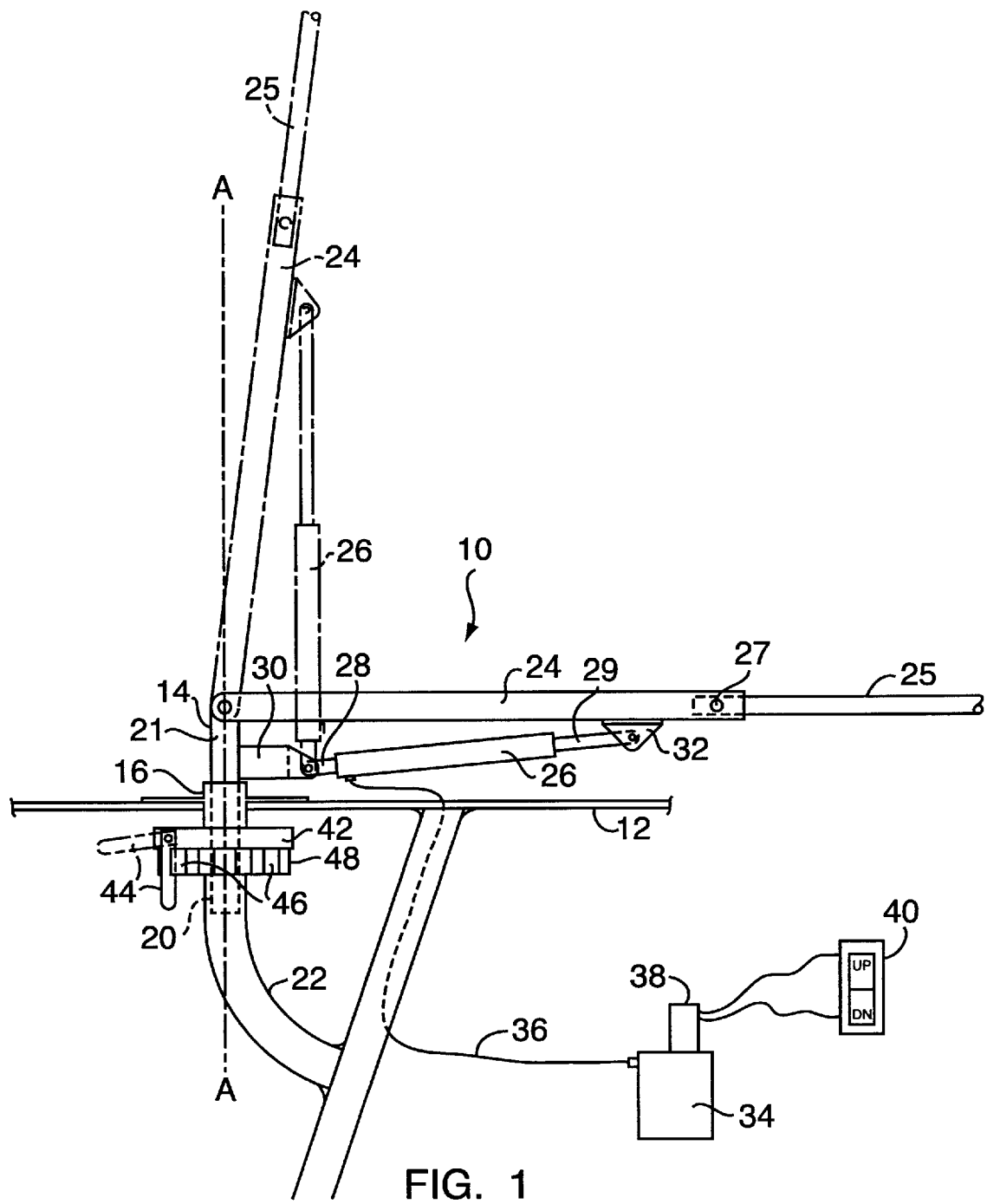
FIG. 1 is a side elevational view of the present invention outrigger.

As shown in FIG. 1, an embodiment of the present invention outrigger generally designated by the reference number 10 is shown mounted to a support surface 12 of a fishing boat (not shown). The outrigger includes vertical member 14 which is rotatable about a vertical axis A—A and supported by a flange 16 attached to support surface 12. A vertical sleeve, a bearing or other means could be used to attach to support surface 12 and rotatably support the vertical member 14 in place of flange 16. A lower portion 20 of vertical member 14 is rotatably supported by a sleeve 22 which is fixedly attached to the fishing boat. An upper portion 21 of vertical member 14 extends above the support surface 12 and supports a boom member 24. Boom member 24 is pivotably coupled to the upper portion 22 of vertical member 14 for rotation about a horizontal axis perpendicular to vertical member 14. The boom member 24 is rotatable between a substantially horizontal position and a substantially vertical position (shown in dotted lines in FIG. 1) with respect to vertical member 14. An extension member 25 is removably coupled to boom member 24 via pin 27 to extend the length of the boom member 25 of outrigger 10.

A hydraulic cylinder 26 is pivotally attached at a first end 28 to the upper portion 21 of vertical member 14 via a bracket 30 for rotation with the vertical member 14. A second end 29 of cylinder 26 is pivotally attached to the boom member 24 by means of a bracket 32. The cylinder 26 is attached to vertical member 14 and boom member 24 such that extension of the length of the cylinder 26 increases the angular position of the boom member 24 with respect to vertical member 14 or raises the boom member 24, and retraction of the length of cylinder 26 decreases the angular position of boom member 24 with respect to vertical member 14 or lowers boom member 24.

In the preferred embodiment cylinder 26 is hydraulic and is coupled to a hydraulic pump assembly 34 via hose 36. Pump assembly 34 includes a control valve 38 which is operable by an electric switch 40. Alternatively, a pneumatic or other type of power actuated cylinder could be used in place of hydraulic cylinder 26 to adjust the angular position of boom member 24 of outrigger 10.

A handle 44 facilitates rotation of vertical member 14 and the outrigger 10 about the axis A—A. Handle 44 is pivotally coupled to a collar 42 which is fixedly attached to lower portion 20 of vertical member 14, such that rotation of the handle 44 rotates collar 42 and vertical member 14 for adjusting the rotational position of boom member 24 of the outrigger 10 with respect to the fishing boat. For example, the boom member 24 may be positioned perpendicular to the length of the boat, in an outboard position, while in use, and stored in an inboard position with the boom member 24 being parallel to the length of the boat. Handle 44 and collar 42 are located interior the cabin of the boat for convenience of use while the outrigger 10 is mounted above support surface 12 or the roof portion of the boat.

The rotational position of outrigger 10 is releasably fixed using a locking collar 48 which is attached to the outer circumference of vertical sleeve 22. Locking collar 48 includes, on the perimeter thereof, a plurality of longitudinal protrusions 46 extending outwardly therefrom and positioned such that a plurality of cavities are formed between the protrusions 46. The locking collar 48 is disposed adjacent to the collar 42 such that when vertical member 14 is rotated to a selected position, the handle 44 can be pivoted and placed between a pair of the protrusions 46 fixing the rotational position of vertical member 14. The protrusions 46 are spaced-apart such that the handle 44 is engageable between a selected pair thereof fixing the rotational position of the outrigger 10. Removal of handle 44 from between the protrusions 46 releases the outrigger 10 for rotation about the axis A—A.

Figure 2:
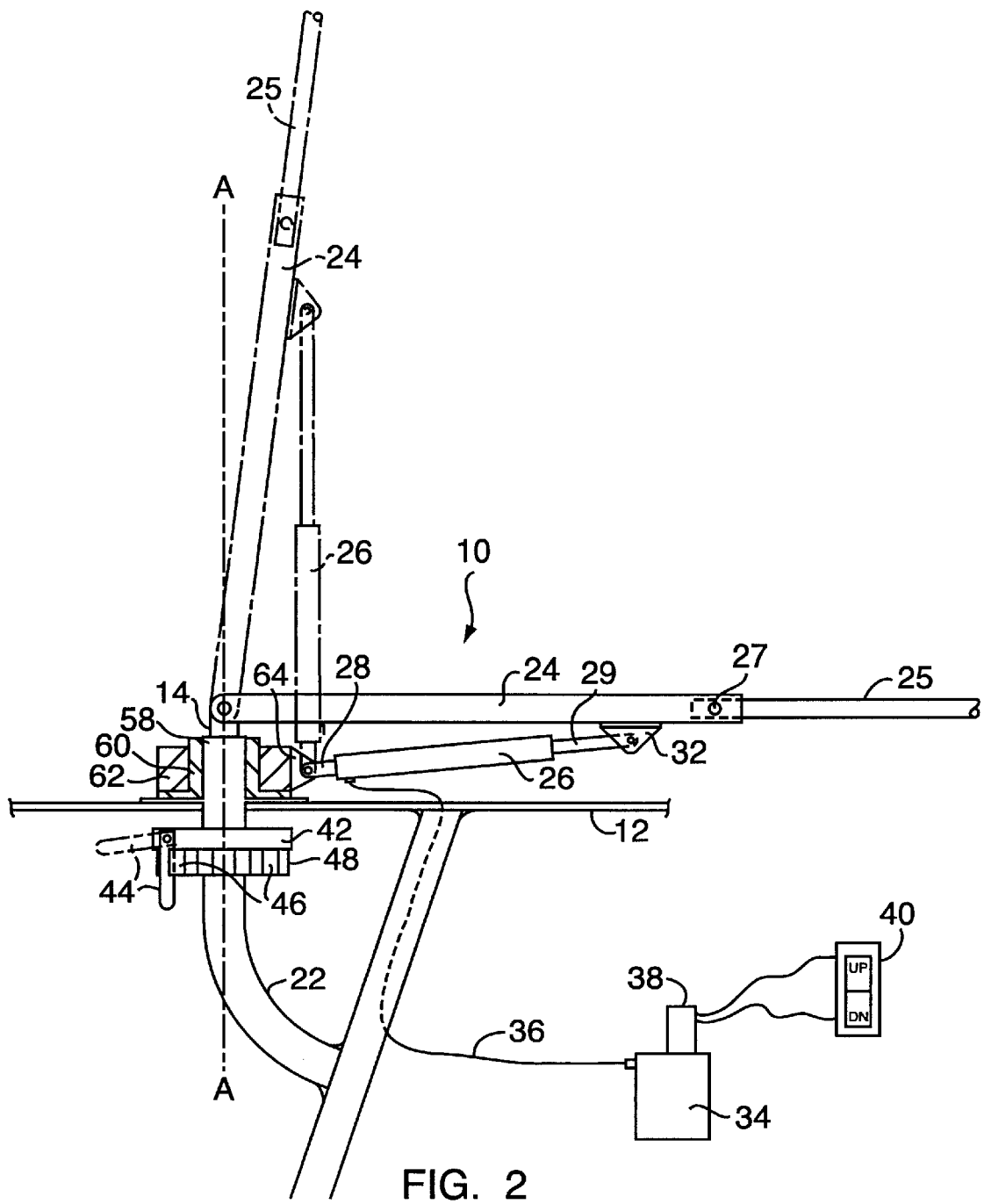
FIG. 2 is a side elevational view of an outrigger embodying the present invention.

Referring to FIG. 2, an embodiment of the present invention is shown as a modification to an existing outrigger, generally 10. The outrigger 10 is modified by attaching the cylinder 26 and control system therefor to the outrigger 10 such that the power actuated cylinder 26 controls the angular position of the boom member 24 with respect to a vertical member 14. Cylinder 26 is operable via electric switch 40 such that the angular position of the boom member 24 can be adjusted remotely from the inside the cabin of a boat or otherwise via switch 40. Thus, one embodiment of the present invention provides a kit to modify an existing outrigger with a cylinder 26 and control system therefor to automate the angular positioning of the boom member 24 of outrigger 10.

Referring again to FIG. 2, a support member 58 is attached to support surface 12 of a fishing boat (not shown) for rotatably supporting a vertical member 14 of the outrigger 10. The kit includes a bushing 60 sized to fit securely around the support member 58. An assortment of various sized bushings 60 can be included with the kit such that various existing outriggers can be modified with the present invention. A collar 62 rotatably attaches to the bushing 60 such that the collar 60 is free to rotate about the axis A—A. A yoke portion 64 extends outwardly from the outer diameter of collar 62. A first end 28 of hydraulic cylinder 26 is pivotally coupled to the yoke 64. A second end 29 of cylinder 26 is pivotally attached to an existing boom member 24 via a bracket 32.

Figure 3:
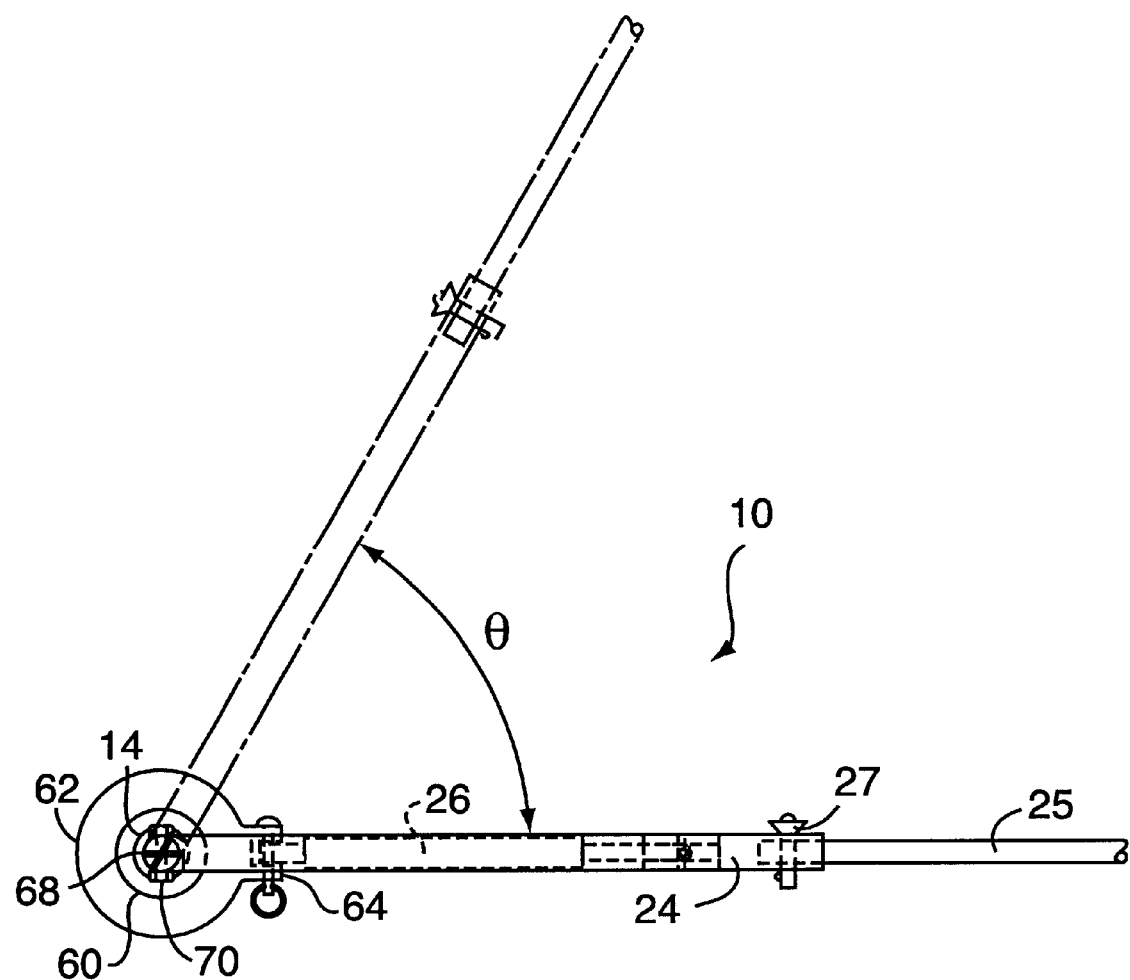
FIG. 3 is a top view of the FIG. 2 embodiment of the present invention.

FIG. 3 shows a top view of the FIG. 2 embodiment of the present invention. The angle theta represents the angle of rotation of the outrigger 10 about the axis A—A as described hereinabove. The kit provided to modify an existing outrigger 10 also includes a spacer or flat washer 68 for adapting a typical serrated or incremental joint between vertical member 14 and boom member 24 on existing systems to a slip joint such that the angular position of boom member 24 can be adjusted relative to vertical member 14 via cylinder 26 without loosening lock screw 70.

The present invention kit for modifying existing outrigger 10 as shown in FIGS. 2 and 3 includes hydraulic pump 34, control valve 38, hydraulic hose 36, switch 40, and hardware and wiring for attachment thereof to outrigger 10 and the fishing boat. The existing outrigger 10 as modified with the kit of the present invention operates as described hereinabove.

While preferred embodiments have been shown and described, various modifications and substitutions may be made without departing from the spirit and scope of the present invention. Accordingly, it is to be understood that the present invention has been shown and described by way of example rather than limitation.

What is claimed is:

1. An outrigger for use with a fishing boat having a support surface for mounting the outrigger thereon, said outrigger comprising:

a vertical member rotatable about a vertical axis, said vertical member having an upper portion extending above said support surface and a lower portion extending below said support surface;

means attached to said support surface for rotatably supporting said vertical member;

support means attached to said boat below said support surface for rotatably supporting said lower portion of said vertical member;

a boom member having a first end thereof pivotably coupled to said upper portion of said vertical member for movement about a horizontal axis;

a variable length cylinder having first and second ends thereof, said first end of said cylinder pivotably coupled to said upper portion of said vertical member, said second end of said cylinder pivotably coupled to said boom member, wherein the angular position of said boom member relative to said vertical member is adjustable by varying the length of said cylinder;

a control system coupled to said cylinder for controlling the length thereof; and wherein, said angular position of said boom member relative to said vertical member is adjustable via said control system.

2. An outrigger for use with a fishing boat as defined in claim 1 further comprising a handle coupled to said lower portion of said vertical member for rotating said outrigger about said vertical axis.

3. An outrigger for use with a fishing boat as defined in claim 2 further comprising means for locking said handle in a selected position thereby preventing rotation of said outrigger about said vertical axis such that said the position of said outrigger is releasably positionable in outboard positions for trolling and inboard positions for storage.

4. An outrigger for use with a fishing boat as defined in claim 1 wherein said means attached to said support surface for rotatably supporting said vertical member of said outrigger is a flange.

5. An outrigger for use with a fishing boat as defined in claim 1 wherein said means attached to said support surface for rotatably supporting said vertical member of said outrigger is a sleeve.

6. An outrigger for use with a fishing boat as defined in claim 4 further comprising:

an upper portion of said flange extending above said support surface; and a collar rotatably coupled to said upper portion of said flange wherein said first end of said cylinder is pivotably coupled to said collar.

7. An outrigger for use with a fishing boat as defined in claim 1 further comprising an extension member removably coupled to a second end of said boom member for extending the length thereof.

8. An outrigger as defined in claim 1, wherein said cylinder is hydraulic.

9. An outrigger as defined in claim 1, wherein said control system further comprises:

a pump coupled to said cylinder for pressurizing said cylinder;

a control valve coupled to said pump and said cylinder;

switch means for operating said control valve; and wherein said angular position of said boom member of said outrigger is controlled via said switch means.

10. An outrigger for use with a fishing boat having a support surface for mounting the outrigger thereon, said outrigger comprising:

a vertical member rotatable about a vertical axis, said vertical member having an upper portion extending above said support surface and a lower portion extending below said support surface;

a flange coupled to said support surface for rotatably supporting said vertical member;

a stationary sleeve attached to said boat below said support surface for rotatably supporting said lower portion of said vertical member;

a boom member having a first end thereof pivotably coupled to said upper portion of said vertical member for movement about a horizontal axis;

a variable length cylinder having first and second ends thereof, said first end of said cylinder pivotably coupled to said upper portion of said vertical member, said second end of said cylinder pivotably coupled to said boom member, wherein the angular position of said boom member relative to said vertical member is adjustable by varying the length of said cylinder;

a control system coupled to said cylinder for controlling the length thereof; and wherein, the angular position of said boom member relative to said vertical member is adjustable via said control system.

11. An outrigger for use with a fishing boat as defined in claim 10 further comprising:

a handle coupled to said lower portion of said vertical member of said outrigger adjacent said stationary sleeve for rotating said vertical member of said outrigger;

a collar attached to said stationary sleeve adjacent said handle for locking said handle thereto preventing rotation of said vertical member of said outrigger about said vertical axis; and wherein said outrigger is releasably positionable in various positions about said vertical axis such as outboard positions for trolling and inboard positions for storage.

12. An outrigger for use with a fishing boat as defined in claim 10 further comprising an extension member removably coupled to a second end of said boom member for extending the length thereof.

13. An outrigger as defined in claim 10, wherein said control system further comprises:

a pump coupled to said cylinder for pressurizing said cylinder;

a control valve coupled to said pump and said cylinder;

switch means for operating the control valve; and wherein said angular position of said boom member of the outrigger is controlled via said switch.

14. A kit for modifying an existing outrigger mounted on a fishing boat, the outrigger having a vertical member rotatable about a vertical axis and a boom member pivotably coupled to the vertical member for movement about a horizontal axis, said kit comprising:

a variable length cylinder having first and second ends thereof;

first and second brackets for pivotably coupling said first and second ends of said cylinder to said vertical member and said boom member of said existing outrigger respectively;

a control system for controlling the length of said cylinder such that the angular position of said boom member is positionable relative to said vertical member via said control system; and wherein said kit is adapted to modify an existing outrigger for automating the angular positioning of said boom member of said outrigger with respect to said vertical member thereof.

15. The kit as defined in claim 14 wherein said control system comprises:

a hydraulic pump assembly for coupling to said cylinder such that said hydraulic pump pressurizes said cylinder to adjust the length thereof;

a control valve for coupling to said pump assembly and to said cylinder;

switch means coupled to said control valve for operating said control valve; and means for attaching said pump, said control valve, and said switching means to said fishing boat.

16. The kit as defined in claim 14 further comprising a spacer for adapting said pivotal coupling between said first end of said boom member and said upper portion of said vertical member to a slip joint.

17. A kit for modifying an existing outrigger mounted on a support surface of a fishing boat, the outrigger having a vertical member rotatable about a vertical axis, a flange attached to said support surface for rotatably supporting said vertical member and a boom member pivotably coupled to said vertical member for movement about a horizontal axis, said kit comprising:

a variable length cylinder having first and second ends thereof;

a collar having means thereon for pivotably coupling said first end of said cylinder thereto;

a bushing for rotatably coupling said collar to an upper portion of said flange such that said collar is rotatable about said vertical axis;

a bracket for pivotably coupling said second end of said cylinder to said boom member of said outrigger;

a control system for controlling the length of said cylinder such that the angular position of said boom member is positionable relative to said vertical member via said control system; and wherein said kit is adapted to modify an existing outrigger mounted on a fishing boat to automate the angular positioning of said boom member of the outrigger with respect to said vertical member thereof.

18. The kit as defined in claim 17 wherein said control system comprises:

a hydraulic pump assembly for coupling to said cylinder such that said hydraulic pump pressurizes said cylinder;

a control valve for coupling to said pump assembly and said cylinder;

switch means coupled to said control valve for operation thereof; and mounting means for attaching said pump, said control valve and said switching means to said fishing boat.

19. The kit as defined in claim 17 further comprising a spacer for adapting said pivotal coupling between said first end of said boom member and said upper portion of said vertical member to a slip joint.

\* \* \* \* \*